(12) United States Patent
Kumar et al.

(10) Patent No.: US 10,146,437 B2
(45) Date of Patent: Dec. 4, 2018

(54) TIER AWARE CACHING SOLUTION TO INCREASE APPLICATION PERFORMANCE

(71) Applicant: CacheBox Inc., San Carlos, CA (US)

(72) Inventors: Sumit Kumar, Pune (IN); Sumit Kapoor, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 0 days.

(21) Appl. No.: 14/660,931

(22) Filed: Mar. 17, 2015

(65) Prior Publication Data

US 2015/0261439 A1 Sep. 17, 2015

Related U.S. Application Data

(60) Provisional application No. 61/954,022, filed on Mar. 17, 2014.

(51) Int. Cl.
| | |
|---|---|
| *G06F 3/06* | (2006.01) |
| *G06F 12/08* | (2016.01) |
| *G06F 11/14* | (2006.01) |
| *G06F 12/0866* | (2016.01) |

(52) U.S. Cl.
CPC ............... *G06F 3/061* (2013.01); *G06F 3/064* (2013.01); *G06F 3/0685* (2013.01); *G06F 11/14* (2013.01); *G06F 12/0866* (2013.01); *G06F 2206/1014* (2013.01); *G06F 2212/225* (2013.01)

(58) Field of Classification Search
CPC ........ G06F 3/064; G06F 3/0685; G06F 11/14; G06F 12/0866; G06F 2206/1014; G06F 2212/225
See application file for complete search history.

(56) References Cited

U.S. PATENT DOCUMENTS

| | | | |
|---|---|---|---|
| 5,657,445 A | 8/1997 | Pearce | |
| 5,732,239 A | 3/1998 | Tobagi et al. | |
| 5,742,792 A * | 4/1998 | Yanai | G06F 3/0601 |
| | | | 710/1 |
| 5,854,941 A | 12/1998 | Ballard et al. | |
| 6,671,791 B1 * | 12/2003 | McGrath | G06F 12/1009 |
| | | | 711/206 |
| 6,754,696 B1 * | 6/2004 | Kamath | G06F 17/30067 |
| | | | 707/999.003 |
| 7,451,291 B2 * | 11/2008 | Justiss | G06F 3/0605 |
| | | | 711/154 |

(Continued)

OTHER PUBLICATIONS

Webopedia, "Disk Cache", Oct. 1, 2002, pp. 1-2, https://web.archive.org/web/20021001223846/http://www.webopedia.com/TERM/D/disk_cache.html.*

(Continued)

*Primary Examiner* — Christopher D Birkhimer

(57) ABSTRACT

An embodiment of the invention provides a method comprising: permitting an application to be aware to be aware of a distribution of a data of the application across a cache and a permanent storage device. The cache comprises a solid state device and the permanent storage device comprises a disk or a memory. In yet another embodiment of the invention, an apparatus comprises: a caching application program interface configured to permit an application to be aware to be aware of a distribution of a data of the application across a cache and a permanent storage device. A caching application program interface is configured to determine an input/output strategy to consume the data based on the distribution of the data.

17 Claims, 2 Drawing Sheets

(56) References Cited

U.S. PATENT DOCUMENTS

| | | | |
|---|---|---|---|
| 7,542,999 B2* | 6/2009 | Kamath | G06F 17/30067 |
| 7,930,270 B2 | 4/2011 | Tsang | |
| 8,090,911 B2* | 1/2012 | Ouren | G06F 9/5077 |
| | | | 711/129 |
| 8,291,166 B2 | 10/2012 | Cornwell et al. | |
| 8,370,850 B2 | 2/2013 | Nochimowski et al. | |
| 8,443,134 B2 | 5/2013 | Flynn | |
| 8,458,282 B2 | 6/2013 | Chen et al. | |
| 8,495,302 B2* | 7/2013 | Ouren | G06F 9/5077 |
| | | | 711/129 |
| 8,549,222 B1 | 10/2013 | Kleiman et al. | |
| 8,578,127 B2* | 11/2013 | Thatcher | G06F 3/0604 |
| | | | 711/103 |
| 8,583,874 B2 | 11/2013 | Dubrovin et al. | |
| 8,601,222 B2* | 12/2013 | Flynn | G06F 11/1048 |
| | | | 711/152 |
| 8,606,998 B2 | 12/2013 | Zulauf | |
| 8,607,001 B2 | 12/2013 | Zhao et al. | |
| 8,689,265 B2* | 4/2014 | Lockett | H04N 5/4403 |
| | | | 725/46 |
| 8,904,117 B1 | 12/2014 | Kalekar et al. | |
| 9,052,993 B2* | 6/2015 | Suzuki | G06F 12/0842 |
| 9,152,648 B2 | 10/2015 | Regni et al. | |
| 9,251,086 B2* | 2/2016 | Peterson | G06F 12/0868 |
| 2001/0007148 A1 | 7/2001 | Murata et al. | |
| 2003/0056060 A1 | 3/2003 | Hertz et al. | |
| 2004/0128459 A1 | 7/2004 | Chanda et al. | |
| 2005/0060316 A1* | 3/2005 | Kamath | G06F 17/30067 |
| 2005/0289312 A1 | 12/2005 | Ghosal et al. | |
| 2006/0170238 A1* | 8/2006 | Justiss | G06F 3/0605 |
| | | | 296/95.1 |
| 2008/0288947 A1 | 11/2008 | Gokhale et al. | |
| 2009/0307700 A1 | 12/2009 | Cazorla Almeida | |
| 2010/0153617 A1 | 6/2010 | Miroshnichenko et al. | |
| 2010/0268907 A1* | 10/2010 | Ouren | G06F 12/0802 |
| | | | 711/170 |
| 2010/0281216 A1 | 11/2010 | Patel et al. | |
| 2011/0047437 A1 | 2/2011 | Flynn | |
| 2011/0138131 A1 | 6/2011 | Regni et al. | |
| 2011/0276765 A1 | 11/2011 | Dawkins | |
| 2012/0066435 A1 | 3/2012 | Colgrove et al. | |
| 2012/0079230 A1* | 3/2012 | Ouren | G06F 12/0802 |
| | | | 711/173 |
| 2012/0131038 A1 | 5/2012 | Aronovich et al. | |
| 2012/0151149 A1 | 6/2012 | Dubrovin et al. | |
| 2012/0192073 A1* | 7/2012 | Vallone | G06F 3/04847 |
| | | | 715/720 |
| 2012/0239857 A1 | 9/2012 | Jibbe et al. | |
| 2012/0278842 A1* | 11/2012 | Look | G11B 27/034 |
| | | | 725/63 |
| 2013/0013861 A1 | 1/2013 | Cornwell et al. | |
| 2013/0086324 A1 | 4/2013 | Soundararajan et al. | |
| 2013/0086552 A1* | 4/2013 | Whitney | G06F 9/44 |
| | | | 717/116 |
| 2013/0111158 A1* | 5/2013 | Suzuki | G06F 12/0842 |
| | | | 711/156 |
| 2013/0185502 A1* | 7/2013 | Ash | G06F 12/0866 |
| | | | 711/113 |
| 2013/0185504 A1* | 7/2013 | Ash | G06F 12/0866 |
| | | | 711/114 |
| 2013/0205097 A1 | 8/2013 | Flynn et al. | |
| 2013/0219078 A1* | 8/2013 | Padmanabhan | G06F 9/45558 |
| | | | 709/238 |
| 2013/0239158 A1* | 9/2013 | Chan | H04N 21/2223 |
| | | | 725/109 |
| 2013/0254488 A1 | 9/2013 | Kaxiras et al. | |
| 2013/0318224 A1 | 11/2013 | Cleary et al. | |
| 2013/0326583 A1* | 12/2013 | Freihold | G06F 3/04815 |
| | | | 726/3 |
| 2014/0019688 A1* | 1/2014 | Ghodsnia | G06F 12/0866 |
| | | | 711/135 |
| 2014/0059292 A1 | 2/2014 | Phelan et al. | |
| 2014/0281121 A1 | 9/2014 | Karamcheti et al. | |
| 2014/0359229 A1 | 12/2014 | Cota-Robles | |
| 2014/0379965 A1 | 12/2014 | Gole et al. | |
| 2015/0074448 A1 | 3/2015 | Ageishi | |
| 2015/0081979 A1 | 3/2015 | Banta et al. | |

OTHER PUBLICATIONS

Morris Kaashoek, "Chapter 6", Sep. 23, 2010, pp. 1-5 https://web.archive.org/web/20121222071910/http://www.cs.columbia.edu/~junfeng/11sp-w4118/lectures/disk.pdf.*

The Linux Documentation Project, "7.6 The Buffer Cache", 1-2, https://web.archive.org/web/20031223081354/http://www.tldp.org/LDP/sag/html/buffer-cache.html.*

Marco Chiappetta, "SSDs vs. Hard Drives vs. Hybrids: Which Storage Tech Is Right for You?", Jan. 17, 2013, pp. 1-7; http://www.pcworld.com/article/2025402/ssds-vs-hard-drives-vs-hybrids-which-storage-tech-is-right-for-you-.html.*

Microsoft, "Synchronous and Asynchronous I/O", Oct. 4, 2011, pp. 1-3, https://web.archive.org/web/20111004012327/http://msdn.microsoft.com/en-us/library/windows/desktop/aa365683(v=VS.85).aspx.*

PC Guide, Logical Block Addressing (LBA), Sep. 2, 2000, pp. 1-2, https://web.archive.org/web/20000902032612/http://www.pcguide.com/ref/hdd/bios/modesLBA-c.html.*

Webopedia, "Logical", Aug. 8, 2002, pp. 1-2, https://web.archive.org/web/20020808144457/http://www.webopedia.com/TERM/L/logical.html.*

Webopedia, "API", Jun. 21, 2000, pp. 1-2, https://web.archive.org/web/20000621114956/http://www.webopedia.com/TERM/A/API.html.*

Anonymous, "Javatuples", Nov. 5, 2010, pp. 1-3; https://web.archive.org/web/20101105112452/http://www.javatuples.org/.*

Office Action for U.S. Appl. No. 14/659,773, dated Jun. 30, 2016, having named inventor Murali Nagaraj.

Office Action for U.S. Appl. No. 14/660,935, dated Nov. 15, 2016, having named inventors Anand Mitra, Dilip Ranade et al.

Office Action for U.S. Appl. No. 14/660,546, dated May 6, 2016, having named inventor Murali Nagaraj.

Dictionary.com, "Transient", Oct. 18, 2011, pp. 1-3, https://web.archive.org/web/20111018105151/http://thesaurus.com/browse/transient.

Office Action for U.S. Appl. No. 14/660,546, dated Aug. 26, 2016, having named inventor Murali Nagaraj.

Advisory Action for U.S. Appl. No. 14/660,546, dated Nov. 9, 2016, having named inventor Murali Nagaraj.

* cited by examiner

US 10,146,437 B2

TIER AWARE CACHING SOLUTION TO INCREASE APPLICATION PERFORMANCE

CROSS-REFERENCE(S) TO RELATED APPLICATIONS

This application claims the benefit of and priority to U.S. Provisional Application 61/954,022, filed 17 Mar. 2014. This U.S. Provisional Application 61/954,022 is hereby fully incorporated herein by reference.

FIELD

Embodiments of the invention relate generally to data storage systems.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against this present disclosure.

There are some solutions that refer to placement of files on a specific tier (tiering solutions). However, these solutions do not provide a mechanism to dynamically let the application know about the placement of files across different tiers.

While the above-noted systems are suited for their intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
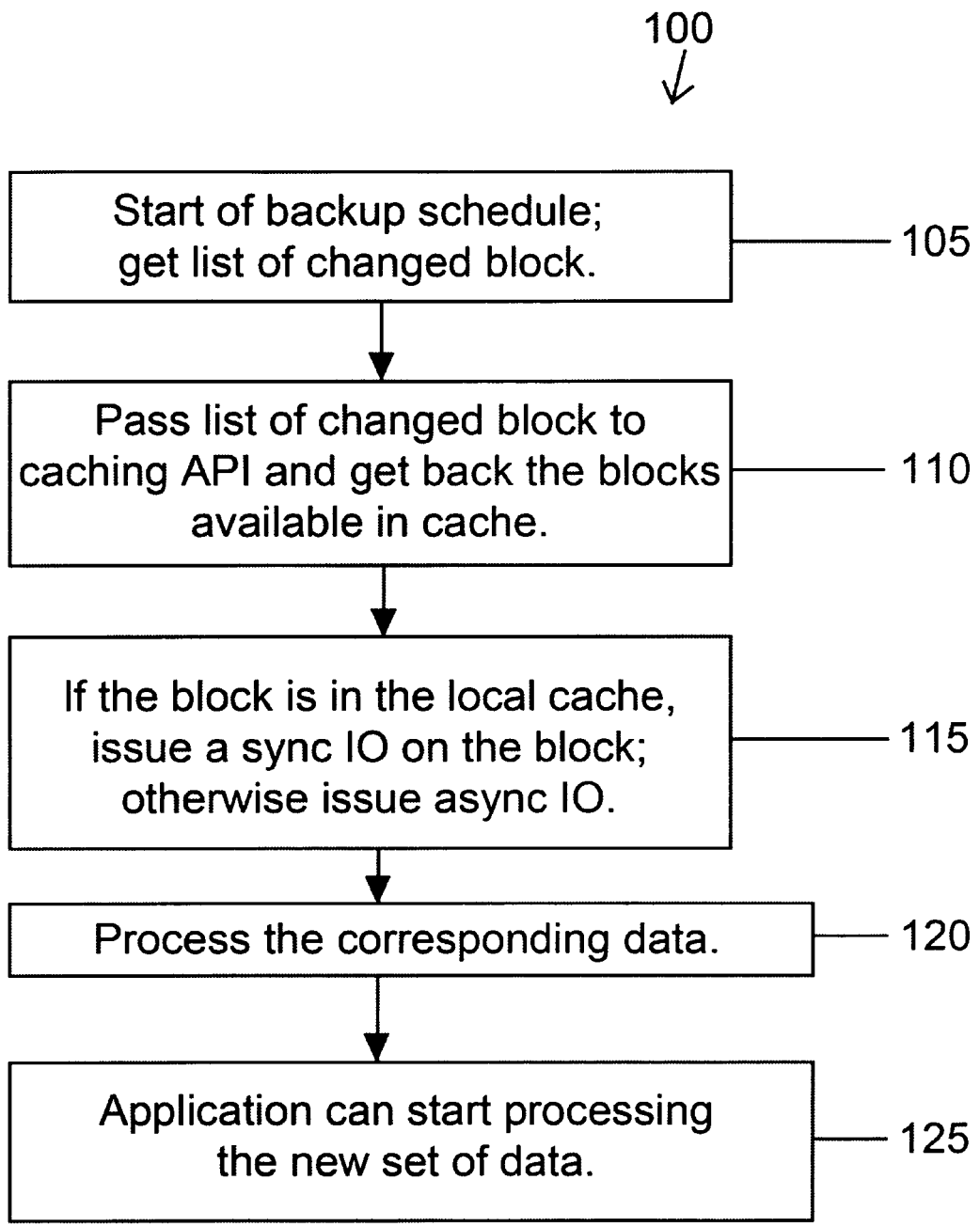
FIG. 1 is a flowchart of a method in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An exemplary embodiment of the invention provides an apparatus and/or method for a tier aware caching solution are disclosed. This solution increases the application performance.

With the adoption of cloud in day to day applications, it is very much possible that a file is distributed across multiple tiers. Some part of a file is present on a faster storage tier locally (e.g., like on SSDs or solid state storage devices) whereas the remaining part of files are on a cloud storage (which is a slower storage). Different storage stacks (e.g., like FUSE (i.e., file system in user space) or QMEU) provide support for cloud as back end where a file data is first written in the local storage and then flushed to cloud in the background.

The flushing of data on cloud may not be in tandem with data protection software processing (e.g., like local Backup, DLP scan). ANTI virus scans are generally scheduled for off hours and all of the data needed by these application processing may not be available in the local cache. Fetching the data from slow storage can take considerable time (mainly in the cloud infrastructure where data are needed to be read over a network) and applications have to unnecessarily wait for the availability of data before the applications can start processing the data. The problem will be more evident when the initial part of a file's data is already pushed to the cloud and is then needed to be fetched back for processing.

In view of the foregoing, there are a number of data protection software that does not need to process data in any specific order and can start processing the data which is available in cache. For example, these data protection software may be a backup solution and antivirus solution that do not need the whole context of the file, or may be a deduplication solution.

An embodiment of the invention provides a system or apparatus that includes a caching API (application program interface) for applications, where the caching API can be used to know the part of data available in the cache. For example, a local backup application does not need to send the changes to a target backup disk in an order, and there may be multiple blocks changed and the blocks can be flushed to a target backup disk in independent order. The data on the backup disk is anyway consistent at the end of the backup schedule.

An embodiment of the invention provides a caching API for applications. With help of this API, applications will advantageously become aware of the placement of data across different tiers.

FIG. 1 is a flowchart of an example of a virtual machine backup method 100 with a caching API, in accordance with an embodiment of the invention.

At 105, at the start of a backup schedule, get a list of changed blocks (e.g., by using the VMware change block tracking which is a commercially available feature).

At 110, pass this list of changed blocks to a caching API, and get back the blocks that are available in cache. Among the changed blocks, the backup application now has two lists: the first list is the list of blocks that are in a local cache tier, and the second list corresponds to the data which is on the slower storage tier.

At 115, if the block is in the local cache, issue a sync IO (synchronous Input/Output request) on the block; otherwise, issue an async IO (asynchronous Input/Output request). For the blocks that are not available in the local cache, the IOs (input(s)/output(s)) will take time to complete.

At 120, since reading from the local cache would be very fast, the application will get corresponding data early from the local cache and start processing that data.

At 125, by the time the application will complete processing the local copy of data, the async IO would also be completed and so the application can start processing this new set of data.

Figure 2:
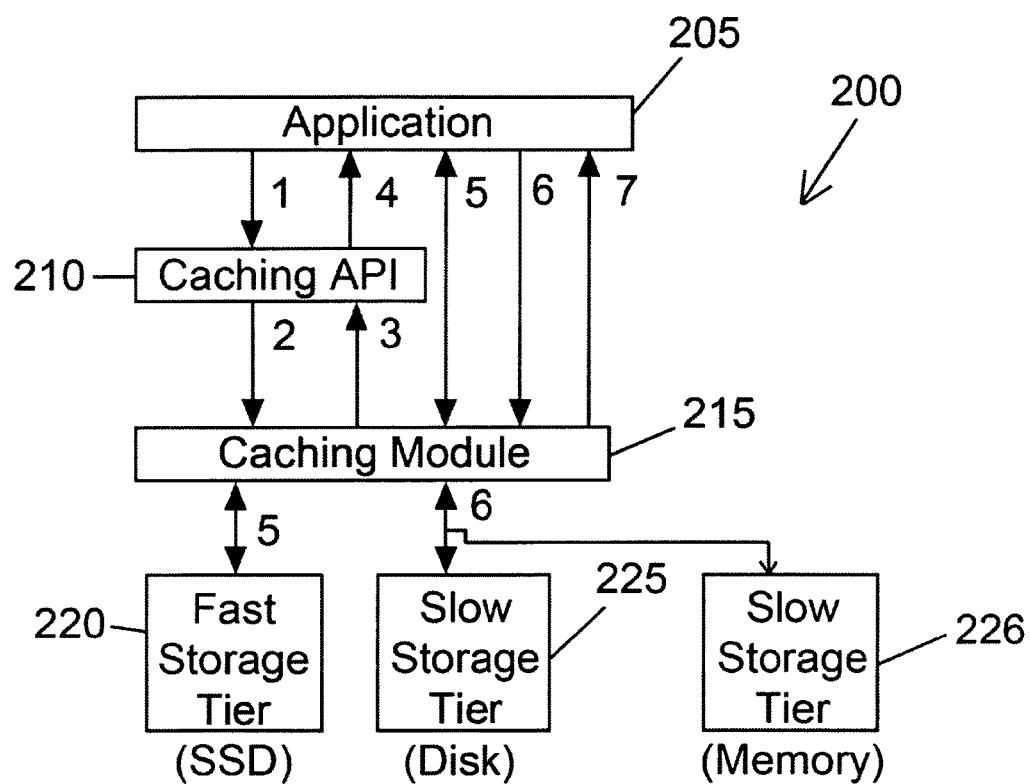
FIG. 2 is a block diagram of an apparatus in accordance with an embodiment of the invention.

FIG. 2 is a block diagram of a system (apparatus) 200 and a work flow in the system 200, in accordance with an embodiment of the invention. Transactions or steps 1 through 7 are also discussed. The application 205 will process blocks and some blocks are currently in a local cache 220 and in a remote storage 225. For example, the application 205 will perform a backup of a file represented by the blocks.

At 1, the application 205 has a list of logical blocks to process. The application 205 will pass this list to a caching API 210.

The set of blocks which an application 205 wants to process may not be same as the changed blocks, and the set is basically application specific. The main purpose of providing the caching API 210 is to let applications 205 be aware (or know) about the distribution of data of the applications 205 across different storage tiers (Memory 226, SSD 220 or solid state device 220, Disk 225 such as a hard disk drive (HDD)), and accordingly is to let an application 205 decide on (or determine) the right IO (input/output) strategy to consume this data. The SSD 220 operates as a cache. The disk 225 and memory 226 are each a permanent storage device.

Below are two sets of examples.

(a) First example: Consider a periodic backup or antivirus solution. These applications 205 are mainly interested in changed blocks so that they can reduce their overall processing time.

How can a backup or antivirus application use the caching API 210 after identifying the changed blocks?

In most of the cases, the backup or antivirus application runs periodically to identify the list of changed blocks (from last schedule). For example, Vmware change block tracking (CBT) is a framework from Vmware which keeps tracks of all the changed blocks in a virtual disk. Other mechanisms for determining the changed blocks and/or changed files are, for example, file system change block tracking mechanism (like NTFS, VxFS FCL) or Windows archive bit, which can be used by applications to get the list of changed blocks and/or changed files.

After identifying the changed blocks, the application 205 can pass this list of blocks to the caching API 210 for identifying the placement of blocks across various tiers of storage.

What is the benefit that the caching API 210 is providing?

The changed blocks which a backup or antivirus solution has to process, may span across multiple files (or a fragmented single file) and can result in random IOs (input/output operation streams). If the application 205 is aware of the placement of the data of the application 205 across various tiers of storage devices or various tiers of storage device types, then the application 205 can initiate IO (input/output) requests intelligently to reduce the overall processing time (additional details are discussed below).

(b) Second example: Now another example is discussed. There is an FTP server which allows multiple simultaneous connections from a client. A client can use this property for uploading a big file in a parallel manner using multiple threads. In this case, the whole file upload is important and it is immaterial which portion of a file is getting uploaded on the server first.

What is the benefit caching API 210 is providing in this second case?

The FTP client can query to the caching layer to identify the placement of files across different tiers of storage devices and eventually use this information for scheduling the intelligent informed IO. The FTP client can start reading+ uploading (reading and uploading) the portion of file which is available in a local cache 220 whereas at the same time, issue the IOs for the blocks those are on slower tiers of storage devices (e.g., disk 225 and/or memory 226).

At 2, the caching API 210 will perform the logical to physical mapping (if required) and interact with the caching module 215 to get the list of blocks that are present in the local cache 220 among the given blocks. The caching API 210 will scan through any logical offsets of the blocks and can determine the logical offsets and physical offsets of the blocks in the mapping functions performed by the caching API 210. The local cache 220 is a fast storage tier and may be, for example, an SSD 220.

At 2, the mapping performed is a standard logical-to-physical mapping step. A file system API is used to provide the file to logical block and logical block to physical block mapping.

A logical offset/logical block is a file system block whereas a physical offset/physical block is a disk block number. For example, a logical offset of a file 0 can be stored in the physical block offset 100.

Most of the applications run on top of the file system and deal in terms of file system logical offsets (e.g., read offset x len l from fileA). Applications do not have any idea about the actual physical location of the blocks which a file is using. It is the responsibility of the file system layer to convert an application's logical offset request to logical block number and then to physical block number before issuing the IO to lower layers.

Contrary to that since most of the caching solutions sits below file system, caching solutions deal in term of physical blocks. All the data structures maintained at the block caching layer remain in terms of physical block numbers.

Now when an application 205 wants to know about data placement of a file(s) or part of a file(s), the application 205 will pass following information to the caching API in the form of comma separated tuples:

<absolute filename, offset, length>, <absolute filename, offset, length>, . . .

The caching API 210 can typically be available in the form of a shared library with which an application 205 can link to use the shared library. Application 205 will call the caching API 210 with needed arguments (<absolute filename, offset, length>, <absolute filename, offset, length>, . . . ).

The shared library in the caching API 210 will convert the logical filename,offset,length mapping to the corresponding list of physical blocks (using the file system APIs), remember this mapping in a local cache 220 so that the caching API shared library can use the mapping later and pass a list of the identified physical blocks to the lower caching layer for tier identification. If the list of physical blocks is long, then the caching API 210 will break the list into smaller sets and query for each set one by one. The final accumulated result will be returned back to the caller application (application 205 which made the request).

As soon as the caching layer will get a request from the upper layer, the caching layer will iterate through the list of blocks and perform following. "Caching layer maintains a separate list for each storage tier (e.g., InMemory_blocks_list for blocks—those are in memory 226; SSD_blocks_list for blocks—those are on SSD 220; and HDD_blocks_list for blocks—those are on Disk 225; Initially all these list will be empty.)."

i. Get a block from the list of blocks. If there are no further blocks to process, go to step v.

ii. Look for this block into OS (operation system) specific data structures (e.g., page cache, buffer cache) to check the availability of this block into memory. If the block is present in memory then add the block number into InMemory_blocks_list and go to step i for the next block, and otherwise go to step iii.

iii. Look into the caching layer metadata table to check block's availability into SSD 220. If block is in the SSD cache 220, then add this block number into SSD_blocks_list and go to step i, and otherwise go to step iv.

iv. Since the block is not in memory 226 such RAM (random access memory) as well as in SSD 220, this implies that block is on slower tier device (i.e., HDD 225). Add the block number into HDD_blocks_list in such a manner that list remain shorted (the reason why the shorted list is kept is described below) and go to step i.

At the end of the above steps, the caching layer (in caching module 215) will have following information, which the caching layer will return to the caching API layer in caching API 210:

InMemory_blocks_list:blocka,blockb, . . .
SSD_blocks_list:blockx,blockz, . . .
HDD_blocks_list:blockt,blocks, . . .

The Caching API shared library will convert back these physical blocks to filename,offset,length format with the added tier information. Note that caching API shared library has already the logical to physical mapping available with the physical blocks so the caching API library does not have to go through the file system API to figure out the logical to physical mapping again. This information will eventually return back to application 205:

InMemory_blocks_list:<absolute filename,offset1,len1>,
SSD_blocks_list:<absolute filename,offset2,len2>,
HDD_blocks_list:<absolute filename,offset3,len3>, At 3, for the given blocks, the caching module 215 will return the list of physical blocks that are in the local cache 220.

At 4, the caching API 210 will perform a standard physical to logical mapping and then return the blocks list to the application 205. The application 205 now has a list of blocks that are available in the local cache 220 and on which the application 205 can immediately start processing. The most recently written data is stored as blocks in the local cache 220.

At 5, the application 205 will issue a sync IO for the blocks residing in the local cache 220. The blocks residing in the local cache 220 will be read very fast and almost immediately available for the application 205 to process.

In the diagram of FIG. 2, an assumption was that, as soon as an application 205 will find a block is in cache 220 (i.e., faster tier storage 220), the application 205 will issue synchronous IO for the tier storage 220 mainly because access time for faster tier blocks will be fast. Though depending upon the tier information, issuing a specific type of IO (synchronous or asynchronous) is the responsibility of the application 205. An embodiment of the invention is just helping the application 205 to let the application 205 know about the placement of blocks across various tiers of storage (across cache 220, disk 225, and memory 226), and it is up to application 205 on how to use this information.

At 6, the application 205 will initiate an asynchronous IO for blocks not residing in the local cache 220. The asynchronous IO is just a read or write of the blocks residing in the slow tier storage 225.

At 7, in the meantime, the blocks from the slow storage tier 225 will be fetched and will be available for the application 205 to process. The slow storage tier 225 comprises at least one permanent storage device such as, for example, at least one hard disk drive 225 or/and another type of storage device such as a memory 226.

Additional features in an embodiment(s) of the invention are now discussed. The whole caching API solution is an extra supporting functionality of a block layer caching solution and a fundamental assumption in this invention is, there is already an SSD caching solution deployed in the environment. The following are the caching module 215 details:

In an embodiment, the caching solution is a block layer caching solution. Block layer Caching solution sits between file system and the block layer and every application IO operation stream goes through the block layer caching solution. Depending upon various caching policies (like access frequencies, user driven polices like place a specific Database table on SSD 220), this block layer transparently puts selected blocks on the faster SSD tier 220. After that all the subsequent IO operation streams related to these blocks get served from SSD 220. The caching solution maintains a metadata lookup table (e.g., a block-map-table) to keep track of blocks that are placed in SSD 220.

Since every IO operation stream is intercepted by the caching layer in the caching module 215, there will be a lookup involve for each and every IO operation stream to check whether that IO operation stream can be served from SSD 220 or not from the SSD 220. If the block-map-table has the entry for the block, the IO operation stream can be served through SSD 220. Otherwise the IO operation stream will be simply passed to the lower layer.

Since memory and SSDs (faster storage tiers 220) are substantially costly, these storage devices are a kind of scarce resource in a data center. Most of the time, these devices are only able to hold application's working set or a part of it if the working set itself is large in size.

Now let us consider the example of a backup and assume that backup schedule is daily at midnight (00:00 hours). When the backup solution will be triggered, the backup solution has to take the backup of all the blocks that have been changed from last backup schedule (i.e., in last 24 hours). The backup solution will first consult a change tracking mechanism to identify all the changed blocks and changed files in last 24 hours (either using vmware CBT, file system's file change log, windows archive bit, or another type of changed block and changed file product feature). All of these changed blocks are needed to be read from primary storage and moved to the backup server.

But the blocks which need to be read may not be available either in memory 226, disk 225, or in SSD 220. It is very much possible that during the day's activity, some of the changed blocks has been evicted from the memory 225, disk 226, or SSD 220 to make way for newly written or newly discovered hot blocks. Such blocks are only present on the slower disk read tier (e.g., tier devices 225 and/or 226) and need to be read from those devices.

Now let us discuss penalty of accesses if the blocks are getting read in the order in which it has been returned by the Change Block tracking. In the absence of caching API 201, the backup solution will start reading the blocks in the order it has been returned by CBT. This approach can create IO operation stream bottleneck problems because of following two reasons:

(1) The blocks that have been changed between the backup schedule may span across different regions of the disk and can produce the effect of random IO operation stream. An application sitting on top of file system has no idea about the physical organization of blocks on disk and so even if the application issues the IO operation streams in sorted logical offsets, the application does not give the guarantee that IO operation streams are sorted at the physical disk layer.

(2) The reading of blocks will require the proportional amount of the physical memory to be free/available. On busy systems where the memory resource is used completely, reading of new set of blocks will require eviction of exiting blocks present in memory. Since the page eviction algorithm is unaware of the context of application, it is very well possible that the pages that are getting evicted from cache are actually part of changed blocks. Subsequently these blocks need to be unnecessarily read again when backup solution will demand for them.

The caching API 210 that are invented herein by the inventor is to solve the above mentioned problems. If an application can process data out of order then the application can use the herein described caching API 210 to intelligently schedule the IO operation streams (depending upon the IO operation stream can be served from a faster tier of storage device or not). For example, for a backup application ordering of blocks may not be important. A Backup task will be declared complete only when all the changed blocks has been backed up irrespective of the order in which blocks are getting backed up. Now let us discuss how are we solving the above mentioned problems using the caching API 210:

A Solution for problem (1) is to reduce the effect of random IO operation stream:

For memory and SSD tiers, random IO operation streams are not a problem. The random IO operation stream problem is mainly associated with HDDs where mechanical head movement adds in IO operation stream latency. HDDs perform well particularly if the IO operation streams are of type sequential block accesses.

To reduce the effect of random IO operation streams, the following method is provided: at the time of adding a block into HDD_blocks_list, blocks are added in a such way that the HDD_blocks_list always remains sorted. In this way, even after converting back the block into logical mapping, the application will get the list of HDDs block that are sorted according to their physical blocks placement and efficient for IO operation to an HDD.

A solution for the above problem (2) is now discussed. Since there are categories of applications like backup and antivirus, those applications can process blocks in any order, and then for such an application, the data to be processed first is in memory 226 or SSD 220. This reordering of processing will help applications by preventing the situation where we are first evicting the data from memory and then later reading it again when the evicted data is actually demanded by application.

Accordingly, an embodiment of the invention provides a method comprising: permitting an application to be aware to be aware of a distribution of a data of the application across a cache and a permanent storage device. The cache comprises a solid state device and the permanent storage device comprises a disk or a memory.

In yet another embodiment of the invention, the method further comprises: wherein based on the distribution of the data, determining an input/output strategy to consume the data.

In yet another embodiment of the invention, an apparatus comprises: a caching application program interface configured to permit an application to be aware to be aware of a distribution of a data of the application across a cache and a permanent storage device. A caching application program interface is configured to determine an input/output strategy to consume the data based on the distribution of the data.

In yet another embodiment of the invention, an article of manufacture comprises: a non-transient computer-readable medium having stored thereon instructions that permit a method comprising: permitting an application to be aware to be aware of a distribution of a data of the application across a cache and a permanent storage device.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   determining, by an application, a list of logical blocks to be processed or a list of changed logical blocks, wherein the changed logical blocks are logical blocks that have been changed after a last schedule in a system;
   passing, by the application to a caching API (application program interface), the list of logical blocks to be processed or the list of changed logical blocks;
   performing, by the caching API, a logical-to-physical mapping based on the list of logical blocks to be processed or the list of changed logical blocks, including determining, by the caching API, logical offsets of blocks and physical offsets of blocks involved in the logical-to-physical mapping wherein the logical-to-physical mapping identifies placements of physical blocks that are distributed among a faster tier storage and a slower tier storage;
   interacting, by the caching API, with a caching module in order for the caching API to obtain a list of physical blocks that are present in a cache;
   returning, by the caching module to the caching API, a list of physical blocks that are in the cache;
   performing, by the caching API, a physical-to-logical mapping based on the list of physical blocks that are distributed among the faster tier storage and the slower tier storage;
   based on the physical-to-logical mapping, providing, by the caching API (application program interface) to the application, a distribution of the list of logical blocks to be processed or the list of changed logical blocks that will be processed by the application, wherein the list of logical blocks to be processed or the list of changed logical blocks permits the application to be aware of a distribution of the list of logical blocks to be processed or the list of changed logical blocks across the cache which comprises the faster tier storage and across a permanent storage device which comprises the slower tier storage;
   wherein the logical blocks to be processed or the changed logical blocks are associated with at least one file;
   wherein the caching API includes a shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage;
   based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, issuing, by the application to the caching module, a synchronous input/output (IO) request on the logical blocks to be processed in the cache or the changed logical blocks in the cache and returning, by the caching module to the application, the logical blocks to be processed in the cache or the changed logical blocks in the cache to the application, and immediately processing, by the application, the logical blocks to be processed from the cache or the changed logical blocks from the cache so as to reduce an overall processing time of the logical blocks to be processed or the changed logical blocks associated with the at least one file and to reduce IO operation stream bottleneck problems;
   based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, subsequently issuing, by the application to the caching module, an asynchronous IO request on the logical blocks to be processed in the permanent storage device or the changed logical blocks in the permanent storage device and returning, by the caching module to the application, the logical blocks to be processed in the permanent storage device or the changed logical blocks in the permanent storage device to the application, and processing, by the application, the logical blocks to be processed from the permanent storage device or the changed logical blocks from the permanent storage device;
   wherein the application subsequently processes the logical blocks to be processed from the cache or the changed logical blocks from the cache and then processes the logical blocks to be processed from the permanent storage device or the changed logical blocks from the permanent storage device, irrespective of an ordering of the logical blocks to be processed or the changed logical blocks in the at least one file, and
   wherein the logical blocks to be processed or the changed logical blocks can span across multiple files or wherein the logical blocks to be processed or the changed logical blocks can span across the at least one file that comprises a fragmented single file.

2. The method of claim 1, wherein the cache comprises a solid state device and the permanent storage device comprises a disk.

3. The method of claim 1,
   wherein blocks residing in the cache are available for the application to process.

4. The method of claim 3,
   wherein the blocks residing in the permanent storage device are available for the application to subsequently process.

5. The method of claim 1, wherein the application calls the caching API with needed arguments in the form of comma separated tuples if the application wants to know about placements of logical blocks in the cache and permanent storage device; and wherein the caching API returns to the application the list of logical blocks in the cache and permanent storage device of at least one file.

6. The method of claim 1, wherein the logical blocks comprise changed blocks which are blocks that have been changed from the last schedule of the application.

7. An apparatus, comprising:
a caching API (application program interface) configured to provide, to an application, a distribution of a list of logical blocks to be processed or a list of changed logical blocks that will be processed by the application, wherein the list of logical blocks to be processed or the list of changed logical blocks permits the application to be aware of a distribution of the list of logical blocks to be processed or the changed logical blocks across a cache and a permanent storage device;
a caching module coupled to the cache;
wherein the application determines, the list of changed logical blocks, wherein the list of logical blocks to be processed or the changed logical blocks are logical blocks that have been changed after a last schedule in a system;
wherein the application passes the list of logical blocks to be processed or the list of changed logical blocks to the caching API (application program interface);
wherein the caching API performs a logical-to-physical mapping based on the list of logical blocks to be processed or the list of changed logical blocks, and wherein the caching API determines logical offsets of blocks and physical offsets of blocks involved in the logical-to-physical mapping wherein the logical-to-physical mapping identifies placements of physical blocks that are distributed among a faster tier storage and a slower tier storage;
wherein the caching API interacts with the caching module in order for the caching API to obtain a list of physical blocks that are present in the cache;
wherein the caching module returns, to the caching API, a list of physical blocks that are in the cache;
wherein the caching API performs a physical-to-logical mapping based on the list of physical blocks that are distributed among the faster tier storage and the slower tier storage;
wherein, based on the physical-to-logical mapping, the caching API provides, to the application, the distribution of the list of logical blocks to be processed or the list of changed logical blocks that will be processed by the application;
wherein the logical blocks to be processed or the changed logical blocks are associated with at least one file;
wherein the caching API includes a shared library that uses the logical-to-physical mapping and the physical-to-logical mapping for permitting the application to become aware of placements of the logical blocks to be processed in the cache or the cached logical blocks in the cache that comprises the faster tier storage and in the permanent storage device that comprises the slower tier storage;
wherein the application issues, to the caching module, a synchronous input/output (IO) request on the logical blocks to be processed in the cache or the changed logical blocks in the cache based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, and the logical blocks to be processed in the cache or the changed logical blocks in the cache are returned by the caching module to the application, and the application immediately processes the logical blocks to be processed from the cache or the changed logical blocks from the cache so as to reduce an overall processing time of the logical blocks to be processed or the changed logical blocks associated with the at least one file and to reduce 10operation stream bottleneck problems;
wherein the application subsequently issues, to the caching module, an asynchronous IO request on the logical blocks to be processed in the permanent storage device or the changed logical blocks in the permanent storage device based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, and the logical blocks to be processed in the permanent storage device or the changed logical blocks in the permanent storage device are returned by the caching module to the application, and the application processes the logical blocks to be processed from the permanent storage device or the changed logical blocks from the permanent storage device;
wherein the application subsequently processes the logical blocks to be processed from the cache or the changed logical blocks from the cache and then processes the logical blocks to be processed from the permanent storage device or the changed logical blocks from the permanent storage device, irrespective of an ordering of the logical blocks to be processed or the changed logical blocks in the at least one file, and
wherein the logical blocks to be processed or the changed logical blocks can span across multiple files or wherein the logical blocks to be processed or the changed logical blocks can span across the at least one file that comprises a fragmented single file.

8. The apparatus of claim 7, wherein the cache comprises a solid state device and the permanent storage device comprises a disk.

9. The apparatus of claim 7, wherein blocks residing in the cache are available for the application to process.

10. The apparatus of claim 9, wherein the blocks residing in the permanent storage device are available for the application to subsequently process.

11. The apparatus of claim 7, wherein the application calls the caching API with needed arguments in the form of comma separated tuples if the application wants to know about placements of logical blocks in the cache and permanent storage device; and
wherein the caching API returns to the application the list of logical blocks in the cache and permanent storage device of at least one file.

12. The apparatus of claim 7, wherein the logical blocks comprise changed blocks which are blocks that have been changed from the last schedule of the application.

13. An article of manufacture, comprising:
a non-transitory computer-readable medium having stored thereon instructions operable to permit an apparatus to perform a method comprising:
determining, by an application, a list of logical blocks to be processed or a list of changed logical blocks, wherein the changed logical blocks are logical blocks that have been changed after a last schedule in a system;

passing, by the application to a caching API (application program interface), the list of logical blocks to be processed or the list of changed logical blocks;

performing, by the caching API, a logical-to-physical mapping based on the list of logical blocks to be processed or the list of changed logical blocks, including determining, by the caching API, logical offsets of blocks and physical offsets of blocks involved in the logical-to-physical mapping wherein the logical-to-physical mapping identifies placements of physical blocks that are distributed among a faster tier storage and a slower tier storage;

interacting, by the caching API, with a caching module in order for the caching API to obtain a list of physical blocks that are present in a cache;

returning, by the caching module to the caching API, a list of physical blocks that are in the cache;

performing, by the caching API, a physical-to-logical mapping based on the list of physical blocks that are distributed among the faster tier storage and the slower tier storage;

based on the physical-to-logical mapping, providing, by the caching API (application program interface) to the application, a distribution of the list of logical blocks to be processed or the list of changed logical blocks that will be processed by the application, wherein the list of logical blocks to be processed or the list of changed logical blocks permits the application to be aware of a distribution of the list of logical blocks to be processed or the list of changed logical blocks across the cache which comprises the faster tier storage and across a permanent storage device which comprises the slower tier storage;

wherein the logical blocks to be processed or the changed logical blocks are associated with at least one file;

wherein the caching API includes a shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage;

based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, issuing, by the application to the caching module, a synchronous input/output (IO) request on the logical blocks to be processed in the cache or the changed logical blocks in the cache and returning, by the caching module to the application, the logical blocks to be processed in the cache or the changed logical blocks in the cache to the application, and immediately processing, by the application, the logical blocks to be processed from the cache or the changed logical blocks from the cache so as to reduce an overall processing time of the logical blocks to be processed or the changed logical blocks associated with the at least one file and to reduce IO operation stream bottleneck problems;

based on the shared library that uses the logical-to-physical mapping and the physical-to-logical mapping for permitting the application to become aware of placements of logical blocks to be processed or the changed logical blocks in the cache that comprises the faster tier storage and in the permanent storage device that comprises the slower tier storage, subsequently issuing, by the application to the caching module, an asynchronous IO request on the logical blocks to be processed in the permanent storage device or the changed logical blocks in the permanent storage device and returning, by the caching module to the application, the logical blocks to be processed in the permanent storage device or the changed logical blocks in the permanent storage device to the application, and processing, by the application, the logical blocks to be processed from the permanent storage device or the changed logical blocks from the permanent storage device;

wherein the application subsequently processes the logical blocks to be processed from the cache or the changed logical blocks from the cache and then processes the logical blocks to be processed from the permanent storage device or the changed logical blocks from the permanent storage device, irrespective of an ordering of the logical blocks to be processed or the changed logical blocks in the at least one file, and wherein the logical blocks to be processed or the changed logical blocks can span across multiple files or wherein the logical blocks to be processed or the changed logical blocks can span across the at least one file that comprises a fragmented single file.

14. The article of manufacture of claim 13, wherein the cache comprises a solid state device and the permanent storage device comprises a disk.

15. The article of manufacture of claim 13,
wherein blocks residing in the cache are available for the application to process.

16. The article of manufacture of claim 13, wherein the application calls the caching API with needed arguments in the form of comma separated tuples if the application wants to know about placements of logical blocks in the cache and permanent storage device;
and wherein the caching API returns to the application the list of logical blocks in the cache and permanent storage device of at least one file.

17. The article of manufacture of claim 13, wherein the logical blocks comprise changed blocks which are blocks that have been changed from the last schedule of the application.

* * * * *